(12) United States Patent
Shacham et al.

(10) Patent No.: US 8,576,448 B2
(45) Date of Patent: Nov. 5, 2013

(54) CLUSTERED HALFTONE GENERATION

(75) Inventors: Omri Shacham, Mitzpe Ramon (IL);
Jan Allebach, West Lafayette, IN (US);
Madhur Gupta, Madison, WI (US);
Carl Staelin, Haifa, IL (US); Mani Fischer, Haifa (IL); Puneet Goyal, San Ramon, CA (US); Tamar Kashti, Rehovot (IL)

(73) Assignee: Hewlett-Packard Developmet Company, L.P., Houston, TX (US)

( * ) Notice: Subject to any disclaimer, the term of this patent is extended or adjusted under 35 U.S.C. 154(b) by 325 days.

(21) Appl. No.: 13/006,234

(22) Filed: Jan. 13, 2011

(65) Prior Publication Data
US 2012/0182344 A1  Jul. 19, 2012

(51) Int. Cl.
*H04N 1/405* (2006.01)
*H04N 1/46* (2006.01)

(52) U.S. Cl.
USPC .......................................... 358/3.06; 358/534

(58) Field of Classification Search
USPC ............. 358/3.06, 3.13, 3.17, 534, 3.01, 445,
358/500; 382/162, 167, 299, 237
See application file for complete search history.

(56) References Cited

U.S. PATENT DOCUMENTS

| | | | |
|---|---|---|---|
| 6,791,718 B1 * | 9/2004 | Allebach et al. | ............. 358/3.13 |
| 7,031,025 B1 | 4/2006 | He et al. | |
| 7,511,857 B2 | 3/2009 | He et al. | |
| 2008/0117464 A1 | 5/2008 | Crounse | |

OTHER PUBLICATIONS

Bhatt et al., "Comparative Study of Search Strategies for the Direct Binary Search Image Halftoning Algorithm", Institute for Mathematics and its Applications Preprint Series # 2126, Univ. of Minnesota, Jul. 2006.

Baqai et al., "Halftoning via Direct Binary Search using a Hard Circular Dot Overlap Modelhalftoning via Direct Binary Search Using a Hard Circular Dot Overlap Model", Proceedings of OSA/IS&T Optics and Imaging in the Information Age, Rochester, NY, Oct. 20-24, 1996.

* cited by examiner

*Primary Examiner* — Charlotte M Baker

(57) ABSTRACT

A method for generating a clustered halftone representation of a continuous-tone image for printing includes applying a search technique. In the search technique, evaluation of a similarity between an initial halftone and the continuous-tone image includes application of an initialization filter to an initial error image that represents a difference between the initial halftone and the continuous-tone image. Evaluation of a similarity between each updated halftone, formed by modifying a previously-evaluated halftone, and the continuous-tone image includes application of an update filter that is different from the initialization filter to an updated error image that represents a difference between the updated halftone and the continuous-tone image. Relating computer program product and data processing system are also disclosed.

21 Claims, 4 Drawing Sheets

CLUSTERED HALFTONE GENERATION

BACKGROUND

Halftoning is a process of transforming a continuous-tone grayscale or color image into an image with a limited number of tone levels. Halftoning may be of use when reproducing the continuous-tone image with a printer or similar device having a limited number of output states. The result of the halftoning process is a digital image representation, which may be referred to as a halftone. The value of each pixel of the halftone represents one of the output states. The output image produced by the halftoning process, or the rendered halftone, is typically made up of dots that were deposited by the printer on a print medium or substrate (such as paper). For example, a pixel value of the halftone may represent the presence or absence of a deposited dot (in binary printing), or one of a limited number of dot sizes (in multi-level printing).

The objective of halftoning is to achieve a rendered halftone that is visually the same as the original continuous-tone image, when viewed by a human viewer from an intended or specified viewing distance. Although magnification may reveal differences between the continuous-tone image and the rendered halftone, limitations in the resolving power of the human eye (at high spatial frequencies) may make them indistinguishable when not magnified.

The distribution of rendered dots with halftoning may be adapted to a particular type of printer or printing technology. For example, if a printer technology is not able to consistently render isolated dots, printing dots in clusters (clustered dot printing) rather than as dispersed isolated dots (dispersed dot printing) may increase reproducibility. When a periodic distribution of dots or clusters may lead to undesirable moire or other patterning, an aperiodic distribution of dots or dot clusters may be preferred.

Direct binary search (DBS) is an iterative method for reducing calculated perceivable differences between the halftone and the continuous-tone image. The calculated perceived difference may be quantified by a cost metric or error metric.

A halftoning process may include application of a screen (also referred to as a "mask", a "dither matrix", or a "threshold array") as part of a screening (or "dithering") process. A screen may be in the form of matrix of threshold values corresponding to a particular appearance in the (e.g. a gray level). A pixel-wise comparison between the image and the screen may be used to determine values of pixels of a halftone of the image. Application of a screen may generate a halftone image using fewer calculations than application of DBS, or may generate an initial halftone for application of DBS.

BRIEF DESCRIPTION OF THE DRAWINGS

Reference is made to the accompanying drawings, in which.

DETAILED DESCRIPTION

Figure 1:
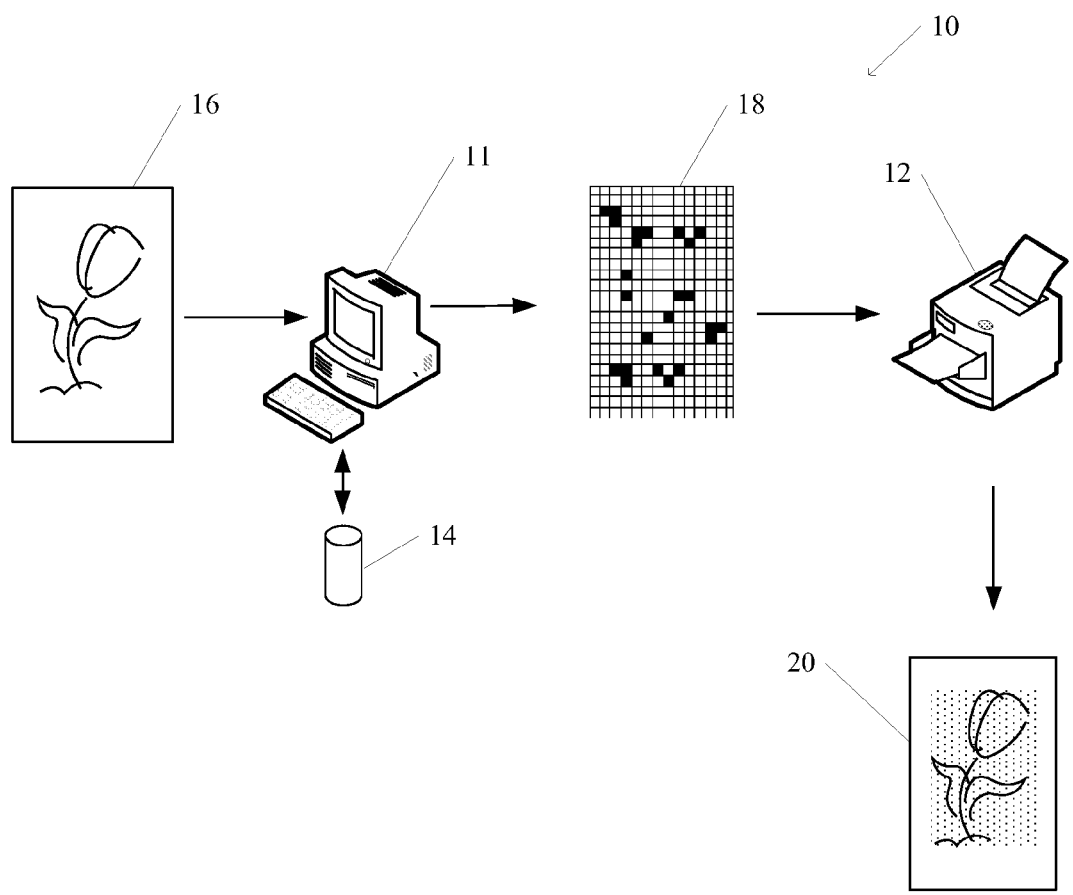
FIG. 1 schematically illustrates a system for application of clustered halftoning DBS in accordance with an embodiment of the invention.

A search technique, such as a DBS technique, for clustered halftoning of a continuous-tone digital image, in accordance with an embodiment of the invention, may include generating an initial halftone that represents the image. The continuous-tone digital image may be in the form of an array of digital pixels. The gray level or color of each pixel may then be represented by a continuum of values. For example, (e.g. between 0 and 1 representing shades ranging from white to black). In this description, grayscale and gray level are to be understood in a general sense as referring to shading or intensity levels of any color or hue.

In the initial and subsequently generated halftones, the value of each pixel may be assigned one of a limited selection of values (e.g. 0 or 1 in the case of binary printing). When the halftone is to be rendered by a printer, the value of each pixel of the halftone may be interpreted to indicate an amount of ink or toner that is to be deposited at a corresponding location on a printing medium or substrate.

The similarity between the initial halftone and the continuous-tone image may be evaluated. For example, a value of a cost function or similar evaluation criterion that indicates a predicted perceptible degree of difference between the halftone and the continuous-tone image may be calculated. Evaluation of the cost function may include applying a filter, hereinafter the initialization filter, to an error image (an image representing pixel-by-pixel subtraction between the continuous-tone image and the initial halftone). Application of the initialization filter may simulate blurring or other effects of the human visual system (HVS). For example, application of the initialization filter may simulate a point spread function of the HVS when the image or halftone is viewed from a particular distance. The initialization filter may be based on a measured or empirically derived response of the HVS. Alternatively, the HVS response may be approximated by a model based on a standard function. For example, the shape of the initialization filter may be described by or expressed by a two-dimensional Gaussian function. The initialization filter may also simulate blurring or other effects that may be introduced by the printer or printing process.

The initialization filter may be characterized by one or more parameters. For example, the initialization filter may be characterized by a filter width that is quantified by a width parameter (e.g. a full width at half maximum, measured in units of pixels or any other appropriate unit). The initialization filter may be normalized such that as sum or integral over the entire filter yields a predetermined value (e.g. 1).

A clustered halftoning search technique, in accordance with an embodiment of the invention, may include performing a series of modifications on the initial halftone, evaluating the result, and either retaining or rejecting each modification based on the evaluated result.

One or more pixels of the initial halftone may be modified. For example, the value of a single pixel may be modified (or toggled, for binary printing), or the values of two pixels may be exchanged or swapped.

An updated value of the cost function as a result of the modification may be calculated. In accordance with an embodiment of the invention, when calculating the updated cost function value, a filter, hereinafter an update filter, may be applied that is different from the initialization filter that was applied in calculating the initial value of the cost function. For example, the update filter may differ from the initialization filter in that the update filter is wider than the initialization filter (e.g. a width parameter that characterizes the update filter is greater than a corresponding parameter of the initialization filter). Thus, the update filter may emphasize lower spatial frequencies than the initialization filter (increasing blurring of pixel-to-pixel differences).

For example, the viewing distance on which the update filter is based may differ from the viewing distance on which the initialization filter was based. Typically, the update filter may be based on a greater viewing distance than the initialization filter.

A pixel-value modification that results in an updated cost function value that indicates a reduced perceptible difference may be retained. Otherwise, the values of the pixels prior to the modification may be restored. The process of modification of pixels values of a previously evaluated halftone so as to form an updated halftone, updating the value of the cost function, and replacing the previously evaluated halftone by the updated halftone when so indicated by the updated value of the cost function, may continue until no modification results in reduced perceptible difference.

Application of an update filter during updating the cost function that is different from the initialization filter that was applied during the initial calculation of the cost function may facilitate clustering of pixels in the halftone as the pixel values are modified. For example, when a difference between the filters may be adjusted so as to determine an amount of clustering in a final halftone.

The form of the cost function may be adapted for the difference between the initialization filter and the update filter. For example, an additional term to the cost function may be expressible as an inner product between an error image and a function of a cross-correlation between the initial error image and the difference between the filters.

A clustered halftoning search technique in accordance with an embodiment of the invention may be applied to create a screen for clustered halftoning. For example, the clustered halftoning search technique may be applied to an initial uniform gray level (e.g. a gray level near the midpoint of a scale ranging from white to black). The resulting initial halftone, determining deposition of dots to attain the initial gray level, may then be applied to future occurrences of that gray level as an initial gray-level clustered-halftoning screen.

The screen may be applied to create a halftone corresponding to a continuous-tone image. In the case of binary printing, halftone pixel values (0 or 1, corresponding to placement or absence of a printed dot) may be determined by application of the screen to the continuous-tone image. For simplicity, let us consider a screen based on the single initial gray level. If the value of a pixel of a continuous-tone image exceeds this initial gray level, pixel values of the corresponding halftone may be determined by the value of a corresponding pixel of the initial halftone.

The clustered halftoning search technique may then be applied to revise the clustered-halftoning screen so as to apply to other gray levels on a scale. Revision of the clustered-halftoning screen to apply to other gray levels may be constrained. For example, a stacking constraint may require that no pixel of a halftone representation of a darker gray level be lighter than a halftone representation of a lighter gray level. Similarly, the stacking constraint may require that no pixel of a halftone representation of a lighter gray level be darker than a halftone representation of a lighter gray level. By applying the clustered halftoning search technique as constrained by the stacking constraint to other gray levels, the screen may be adapted to an entire range of gray levels.

For example, in the case of binary printing, the halftone may determine whether a dot is to be deposited at a particular location. The stacking constraint may determine that if a dot is be deposited at a particular location when rendering one gray level, a dot must be deposited at that location when rendering a darker gray level. Similarly, if a dot is absent (a "hole" is present) when rendering one gray level, a dot must be absent from that location when rendering a lighter gray level.

FIG. 1 schematically illustrates a system for application of clustered halftoning DBS in accordance with an embodiment of the invention. System 10 may include a printer 12 and an associated processor 11. For example, processor 11 may be incorporated into a computer. Printer 12 may then be configured to serve as a peripheral device of processor 11. Functionality of processor 11 may be distributed among a plurality of separate or intercommunicating processing devices. For example, some or all of the functionality of processor 11 may be incorporated into a processor that is a component of, or is associated with, printer 12.

Processor 11 may access data stored on data storage device 14. Data storage device 14 may include a plurality of data storage devices, each accessible by processor 11. Data storage device 14 may be incorporated into, or may be external to, processor 16. Data storage device 14 may include stored instructions for operation of processor 11. Data storage device 14 may be configured to store input to, and results of, various processes executed by processor 11. For example, data associated with clustered halftoning DBS in accordance with an embodiment of the invention may be stored on data storage device 14.

System 10 may be configured to produce a halftone 18 whose pixel values represent continuous-tone image 16. For example, continuous-tone image 16 may be input from an external device (e.g. a scanner or digital camera that may communicate with processor 11), or may be stored on data storage device 14. Halftone 18 may be generated by processor 11 by application of clustered halftoning DBS in accordance with an embodiment of the invention. Alternatively, halftone 18 may be generated by application of a clustered-halftoning screen created through application of clustered halftoning DBS in accordance with an embodiment of the present invention.

System 10 may be configured to render halftone 18 in the form of rendered halftone 20. For example, printer 12 may be configured to deposit ink or toner on a substrate or printing medium in accordance with values of pixels of halftone 18.

Printer 14 may include any type of printing device known in the art for printing a halftone image. Rendered halftone 20 may include a pattern of dots of ink or toner deposited by printer 14 on a substrate such as a sheet of paper.

Figure 2:
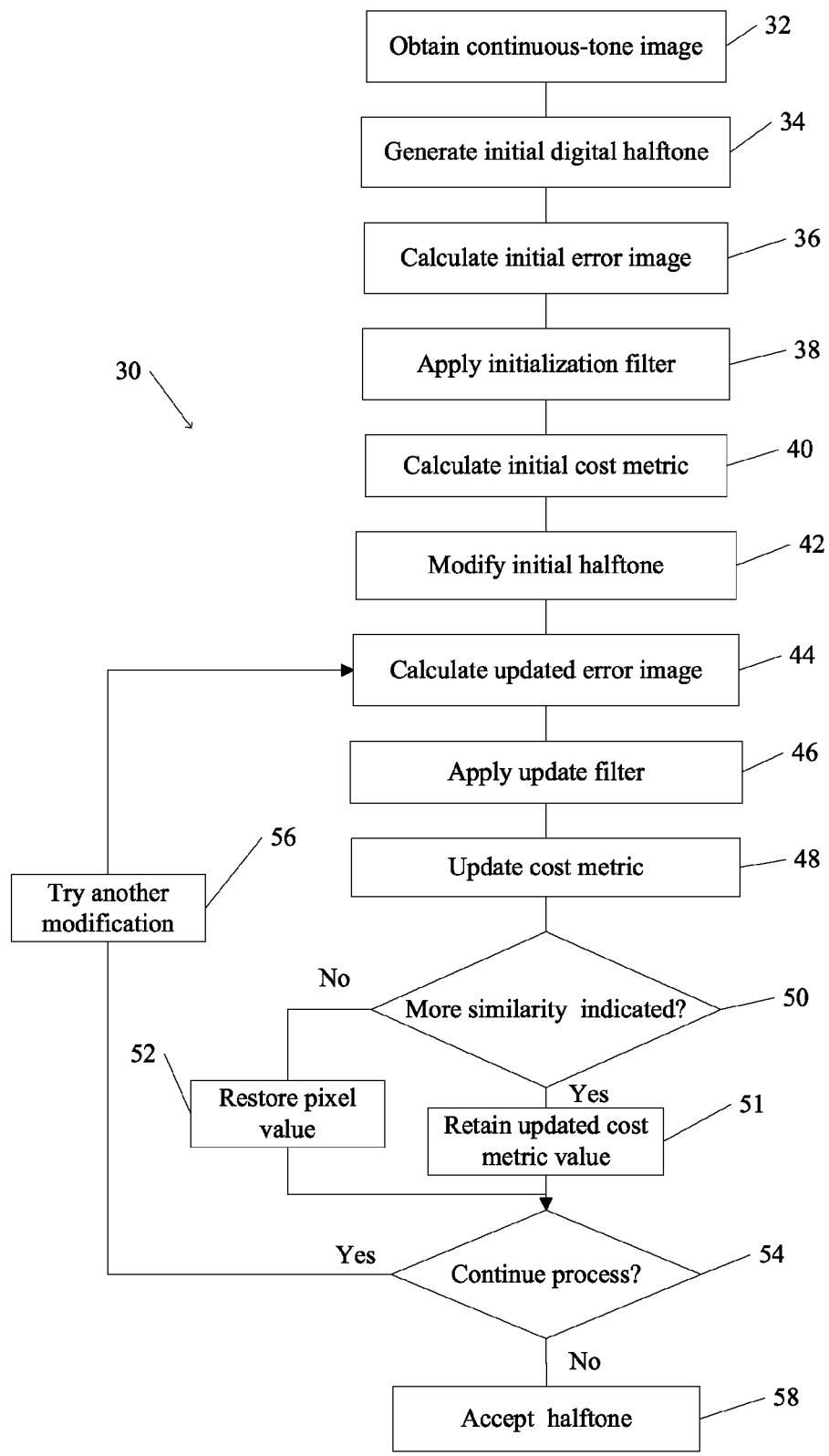
FIG. 2 is a flowchart for a clustered halftoning DBS method, in accordance with an embodiment of the invention.

FIG. 2 is a flowchart for clustered halftoning DBS method 30, in accordance with an embodiment of the invention.

It should be understood with regard to this flowchart, and with regard to all flowcharts herein described, that the division of the method into discrete steps is for convenience and clarity only. Alternative division of the method into steps is possible with equivalent results, and all such equivalent divisions into should be understood as included within the scope of embodiments of the invention. The order of the steps illustrated in the flowcharts is selected for the sake of convenience and of clarity. Steps of the method may be performed concurrently or in an alternative order with equivalent results unless specifically identified otherwise. Such reordering of the steps should be understood as included within the scope of embodiments of the invention.

Clustered halftoning DBS method 30 may include obtaining a continuous-tone image to be rendered as a rendered halftone (step 32). An initial halftone that represents the continuous-tone image may be generated (step 34). For example, in the case of binary printing, each pixel of the initial halftone may be assigned a value of 0 or 1. Pixel values of the initial halftone may be in accordance with corresponding continuous-tone pixel values in the continuous-tone image. For example, pixel values of the initial halftone may be assigned through application of a screen to pixels of the continuous-tone image or by conventional (not clustered halftoning) DBS (to generate a dispersed dot pattern).

Figure 3:
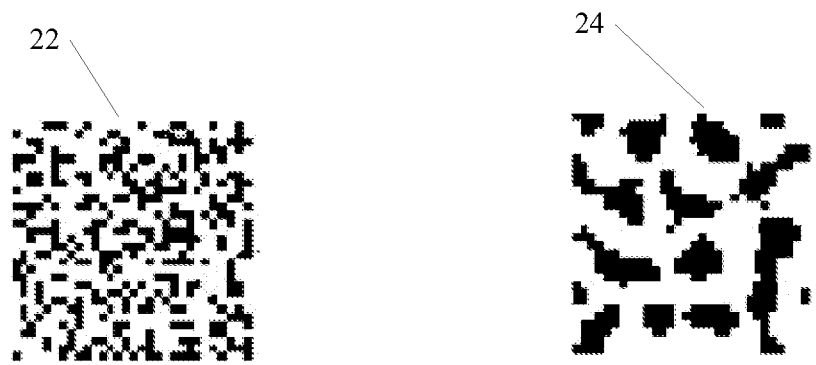
FIG. 3 shows an example of a magnified section of halftones, in accordance with an embodiment of the invention.

FIG. 3 shows an example of a magnified section of halftones, in accordance with an embodiment of the invention. For example, a section of an initial halftone may appear, when magnified, as initial halftone section 22. Dark pixels represent dot pixels that would be rendered as dots by a printer. The distribution of dot pixels in initial halftone section 22 may not exhibit strong clustering.

An initial error image may be calculated, e.g., by subtracting pixels of the initial halftone and corresponding pixels of the continuous-tone image from one another (step 36). An initialization filter may be applied to the error image to form a filtered error image (step 38). For example, pixels of the initialization filter may be convolved with pixels of the error image.

Figure 4:
FIG. 4 schematically shows examples of HVS filters, in accordance with an embodiment of the invention.

FIG. 4 schematically shows examples of filters for application in clustered halftoning DBS, in accordance with an embodiment of the invention. For example, the form of an initialization filter may resemble that of initialization filter 26. Initialization filter 26 is drawn in FIG. 4 in the form of a three dimensional curve, where the height represents the filter response values and the horizontal dimensions represent the plane of the halftone pixels. Filter response values of a filter such as initialization filter 26 may be normalized. For example, response value may be normalized such that a sum (or integral) over all values equals one.

An initial cost metric value may be calculated (step 40). For example, the initial cost metric may be calculated in the form of a sum or integral over all pixels of the square of the filtered error image.

Quantities that were calculated at this point of clustered halftoning DBS method 30 or at any earlier point may be stored for retrieval during later stages of clustered halftoning DBS method 30. For example, such quantities may be saved in an appropriately indexed lookup table.

Clustered halftoning DBS method 30 may include performing an iterative optimization procedure of modification of the halftone and evaluation of the results. The initial halftone may be modified (step 42). For example, the value of a single pixel may be modified, or the values of neighboring pixels may be exchanged. An updated error image may be calculated (step 44). For example, pixels of the modified halftone and corresponding pixels of the continuous-tone image may be subtracted from one another.

An update filter may be applied to the updated error image to form a filtered updated error image (step 46). For example, the form of an update filter may resemble that of update filter 28 (FIG. 4). For example, update filter 28 may have a broader form than initialization filter 26. A broader form may imply that application of update filter 28 may limit the filtered updated error image to lower spatial frequencies than would application of initialization filter 26. For example, initialization filter 26 may model viewing by the HVS from a shorter viewing distance (e.g. 12 inches), while update filter 28 may model viewing from a longer viewing distance (e.g. 48 inches).

The updated cost metric θ may be calculated based on the filtered updated error image (step 48). For example, calculation of the updated cost metric may include a term $\theta_1$ that may be based on the square of the filtered updated error image (similar to that used in step 40). Calculation of the updated cost metric may also include a second, clustering term $\theta_{clust}$ that is related to pixel clustering. For example, the clustering term may, e.g., be added to, or subtracted from, the first term.

For example, the clustering term may be expressible in the form of an inner product:

$$\theta_{clust} = 2\sum_m e[m]c_{pe}[m]$$

where m represents pixel coordinates, e[m] represents the error image, and $c_{pe}[m]$ represents a cross-correlation between the initial error image $e_0[m]$ (e.g. as calculated in step 36) and a difference between the initialization filter $c_p^i[m]$ and the update filter $c_p^u[m]$. For example, $c_{pe}[m]$ may be expressed as:

$$c_{pe}[m] = \sum_n e_0[n](c_p^i[m-n] - c_p^u[m-n])$$

where n also represents a pixel coordinate for the purpose of the convolution.

The value of the updated cost metric may be compared to a previous value of the cost metric (step 50). For example, the updated cost metric may be compared with an initial cost metric (such as the initial cost metric calculated in step 40). If previous modifications to the halftone were made, the updated cost metric may be compared with the value of the cost metric that was calculated after the previous modification.

If the comparison indicates that the modified halftone is perceptibly more similar to the continuous-tone image than the previous halftone prior to the modification (e.g. if the updated value of the cost metric is less than the previous value), the modification may be retained. The updated cost metric value may be retained for evaluation of subsequent modifications of the halftone (step 51).

If the comparison indicates that the modified halftone is not perceptibly more similar to the continuous-tone image than the previous halftone, the modified pixels may be restored to their previous values (step 52).

Clustered halftoning DBS method 30 may include repeating the process of trying modifications to the halftone, evaluating the results, and retaining the modifications when the results so indicate. For example, one or more criteria may be examined in deciding whether to continue repeating the process (step 54). If a decision is made to continue, another trial modification may be made to the halftone (step 56), and the updated results may be evaluated with regard to the cost metric (repeating steps 44 through 54).

For example, if trial modifications have not been tried on all pixels of the halftone (or of at least a section of it, e.g. where it had been previously determined that that section may be indicative of a degree of halftone quality), the process of steps 44 through 56 may be repeated until all modifications have been tried.

After modifications of all pixels have been tried and evaluated, further iterations of the process may be performed. For example, further iterations may be performed as long as the number of iterations is less than a predetermined iteration limit. Iterations of the process may continue until convergence is detected. For example, convergence may occur prior to reaching the predetermined iteration limit, or in the absence of such a limit. The process may be considered to have converged when no further modifications to the halftone result in a change to cost metric that indicates a perceptibly greater similarity between the halftone and the continuous-tone image.

When no further modifications or iterations are to be performed, the updated halftone (or the original if no modifications were made) may be accepted as a final halftone for rendering (step 58). For example, the updated halftone may be rendered by a printer or similar device in the form of dots of ink or toner deposited on a medium. The final halftone may be saved or stored for rendering at a later time.

For example, a section of a final halftone may appear, when magnified, as final halftone section 24 (FIG. 3). The distribution of dot pixels in final halftone section 24 may exhibit more clustering than an initial halftone, such as illustrated by initial halftone section 22.

Clustered halftone DBS may be applied to create a clustered-halftoning screen for a range of gray levels. For example, for a selected gray level, clustered halftone DBS may generate a halftone to represent a uniform image area with a gray level equal to the selected gray level. The pattern of pixels of the resulting halftone may be used as a clustered-halftoning screen for the selected gray level. Thus, when rendering an area of an image, the area having a gray level that is equal to, or darker than, the selected gray level, a dot ink may be deposited as indicated by the pixel values of the clustered-halftoning screen.

Pixel patterns of the clustered-halftoning screen may be subject to a stacking constraint. For example, for binary printing, a stacking constraint may require that application of a clustered-halftoning screen to a darker gray level indicate printing of all dots that would be indicated by application of the clustered-halftoning screen to a lighter gray level. Similarly, application of the clustered-halftoning screen to a lighter gray level may not indicate printing of any dot that would not be printed when applying the clustered-halftoning screen to a darker gray level. A similar constraint may apply for multi-level printing.

Figure 5:
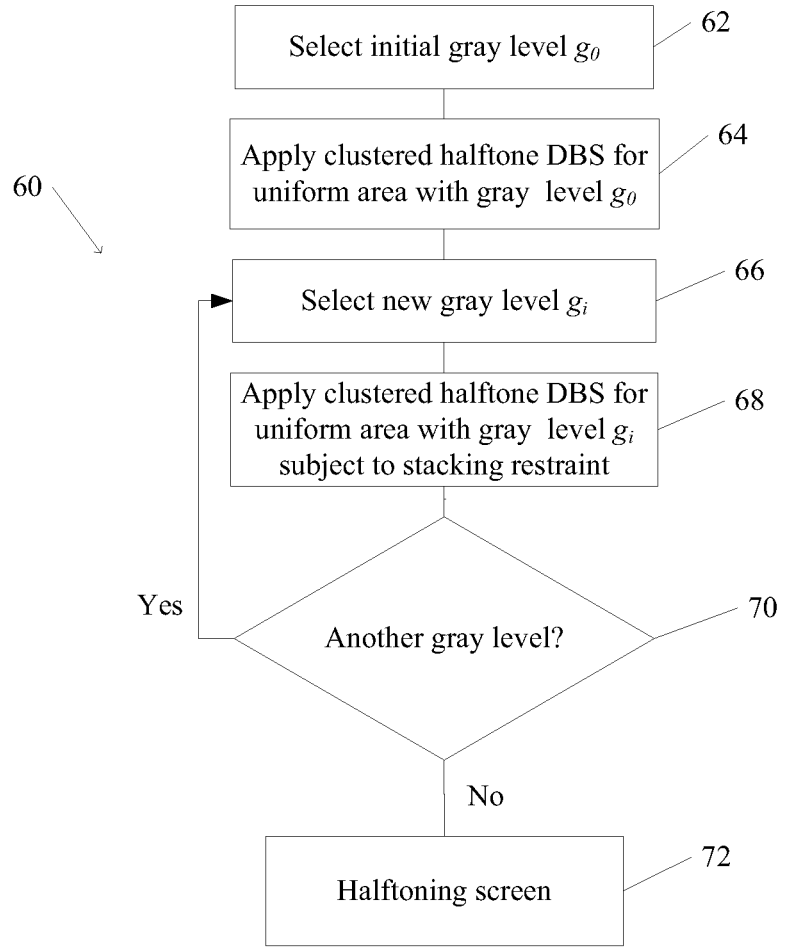
FIG. 5 is a flowchart of a method for application of clustered halftoning DBS to clustered-halftoning screen creation, in accordance with an embodiment of the invention.

FIG. 5 is a flowchart of a method 60 for application of clustered halftoning DBS to clustered-halftoning screen creation, in accordance with an embodiment of the invention. Clustered halftoning DBS clustered-halftoning screen creation method 60 may include selecting an initial gray level $g_0$ (step 62). A clustered-halftoning screen may be calculated for initial gray level $g_0$. The clustered-halftoning screen created for initial gray level $g_0$ may then be used as a basis for adapting the clustered-halftoning screen to other gray levels. For example, an initial gray level $g_0$ near the middle of a gray scale may be selected.

Clustered halftone DBS (e.g. as shown in FIG. 2) may be applied to create a clustered-halftoning screen based on initial gray level $g_0$. For example, clustered halftone DBS may be applied to create a halftone that represents a uniform region of an image with a gray level equal to initial gray scale $g_0$ (step 64). Pixel values of the halftone may be applied as a clustered-halftoning screen to a region of a continuous-tone image with gray level similar to initial gray scale $g_0$.

Another gray level $g_i$ may be selected (step 66). For example, a gray level $g_i$ that is adjacent to initial gray level $g_0$ in the gray scale may be selected immediately after creation of a clustered-halftoning screen for initial gray level $g_0$. The clustered-halftoning screen may be adapted to gray level $g_i$.

Typically (and except for gray levels near the darkest and lightest extremes of the gray scale), after adaptation of the clustered-halftoning screen for a gray level $g_j$, a new gray level $g_i$ may be selected that is adjacent to gray level $g_j$ in the gray scale.

Clustered halftone DBS method, constrained by the stacking constraint, may be applied to create a clustered-halftoning screen for selected gray level $g_i$. For example, clustered halftone DBS, constrained by the stacking constraint, may be applied to create a halftone that represents a uniform region of an image with a gray scale equal to gray scale $g_i$ (step 68).

For example, in applying clustered halftone DBS to a gray level $g_i$ that is near or adjacent to a previously selected gray level $g_j$, the clustered-halftoning screen as adapted to previously selected gray scale $g_j$ may be used as the initial halftone.

When modifying the halftone during the course of application of clustered halftone DBS to selected gray level $g_i$ and after adapting the clustered-halftoning screen to a previously selected gray level $g_j$, the stacking constraint may be complied with.

For example, selected gray level $g_i$ may be darker than previously selected gray level $g_j$ whose clustered-halftoning screen is used as the initial halftone for clustered halftone DBS. In this case, during modification of the halftone, the stacking constraint may determine that a pixel that previously indicated no dot may be changed to indicate a dot (for binary printing), but not vice versa. In the case of multi-level printing, a pixel may be modified to indicate a darker dot, but not a lighter dot.

Similarly, selected gray level $g_i$ may be lighter than previously selected gray level $g_j$ whose clustered-halftoning screen is used as the initial halftone for clustered halftone DBS. In this case, during modification of the halftone, the stacking constraint may determine that a pixel that previously indicated a dot may be changed to indicate no dot (for binary printing), but not vice versa. In the case of multi-level printing, a pixel may be modified to indicate a lighter dot, but not a darker dot.

If other gray levels of the gray scale remain to which constrained clustered halftone DBS has not yet been applied for adaptation of the clustered-halftoning screen (step 70), another gray level may be selected (return to step 66) and a halftone created (step 68). As discussed above, the newly selected gray level may be adjacent to the previously selected gray level. For example, an initial gray level may be selected that is near the middle of the gray scale. Another gray level adjacent to the initial gray level (e.g. darker) may be selected. Each next selected gray level may be adjacent to the previously selected gray level until an end (e.g. the dark end) of the gray scale is reached. The other gray level adjacent to the initial gray level (e.g. lighter) may be then be selected, and the process of selecting adjacent levels continued until the other (e.g. light) end of the gray scale is reached.

When a clustered-halftoning screen has been adapted to all gray levels of a range of gray scales by application of constrained clustered halftoning DBS, the resulting clustered-halftoning screen may be applied to create halftones for rendering continuous-tone images (step 72).

Further processing may be applied to adapt the clustered-halftoning screen for applying to image rendering. Such processing may include reapplying constrained clustered halftoning DBS starting from a different initial gray level (e.g. a gray level selected from near the dark end of the gray scale) to some of the gray levels (e.g. the darker gray levels). Processing may also include adjusting individual pixels of the clustered-halftoning screen with respect to some of the gray levels. Processing may also include application of wider filters during application of constrained clustered halftoning DBS to gray levels near the dark and light ends of the gray scale.

Clustered halftoning DBS, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for generating a clustered halftone representation of a continuous-tone image for printing, the method comprising applying a search technique wherein evaluation of a similarity between an initial halftone and the continuous-tone image includes application of an initialization filter to an initial error image that represents a difference between the initial halftone and the continuous-tone image, and wherein evaluation of a similarity between each updated halftone, formed by modifying a previously-evaluated halftone, and the continuous-tone image includes application of an update filter that is different from the initialization filter to an updated error image that represents a difference between the updated halftone and the continuous-tone image.

2. The method of claim 1, wherein modifying the previously-evaluated halftone includes changing a value of at least a pixel of the previously-evaluated halftone, and wherein the search technique comprises:
   replacing the previously-evaluated halftone with the updated halftone if the evaluation of the updated halftone indicates that the updated halftone is more similar to the continuous-tone image than the previously-evaluated halftone; and
   generating a final halftone by iteratively repeating the process of forming the updated halftone, evaluating the similarity of the updated halftone to the continuous-tone image, and replacing the previously-evaluated halftone with the updated halftone in accordance with the evaluation, until a predetermined criterion is satisfied.

3. The method of claim 2, wherein the value is limited to either 0 or 1, and wherein changing the value comprises toggling the value of a single pixel or swapping values of two pixels.

4. The method of claim 2, wherein the predetermined criterion includes at least one criterion selected from a list of criteria consisting of: said changing a value of at least a pixel is applied to all pixels of at least a section of the halftone, detection of convergence, and said iteratively repeating the process is performed a predetermined number of times.

5. The method of claim 2, comprising generating a clustered-halftoning screen for a gray level by applying the search technique to a continuous-tone image that includes a uniform region of pixels with the gray level, and wherein changing the value is constrained by a stacking constraint with respect to a previously generated clustered-halftoning screen that was generated for a different gray level.

6. The method of claim 1, wherein a width of the update filter is greater than a width of the initialization filter.

7. The method of claim 1, wherein a form of the update filter or of the initialization filter is expressible as a two-dimensional Gaussian function.

8. The method of claim 1, wherein evaluating the similarity of the updated halftone to the continuous-tone image comprises calculating a term that includes an inner product of the updated error image with a convolution of the initial error image with a function that represents a difference between the initialization filter and the update filter.

9. A non-transitory computer readable medium containing instructions that when executed cause a processor to execute the step of applying a search technique wherein evaluation of a similarity between an initial halftone and the continuous-tone image includes application of an initialization filter to an initial error image that represents a difference between the initial halftone and the continuous-tone image, and wherein evaluation of a similarity between each updated halftone, formed by modifying a previously-evaluated halftone, and the continuous-tone image includes application of an update filter that is different from the initialization filter to an updated error image that represents a difference between the updated halftone and the continuous-tone image.

10. The non-transitory computer readable medium of claim 9, wherein modifying the previously-evaluated halftone includes changing a value of at least a pixel of the previously-evaluated halftone, and wherein the search technique comprises:
   replacing the previously-evaluated halftone with the updated halftone if the evaluation of the updated halftone indicates that the updated halftone is more similar to the continuous-tone image than the previously-evaluated halftone; and
   generating a final halftone by iteratively repeating the process of forming the updated halftone, evaluating the similarity of the updated halftone to the continuous-tone image, and replacing the previously-evaluated halftone with the updated halftone in accordance with the evaluation, until a predetermined criterion is satisfied.

11. The non-transitory computer readable medium of claim 10, wherein the value is limited to either 0 or 1, and wherein changing the value comprises toggling the value of a single pixel or swapping values of two pixels.

12. The non-transitory computer readable medium of claim 10, wherein the predetermined criterion includes at least one criterion selected from a list of criteria consisting of: said changing a value of at least a pixel is applied to all pixels of at least a section of the halftone, detection of convergence, and said iteratively repeating the process is performed a predetermined number of times.

13. The non-transitory computer readable medium of claim 10, comprising generating a clustered-halftoning screen for a gray level by applying the search technique to a continuous-tone image that includes a uniform region of pixels with the gray level, and wherein changing the value is constrained by a stacking constraint with respect to a previously generated clustered-halftoning screen that was generated for a different gray level.

14. The non-transitory computer readable medium of claim 9, wherein a width of the update filter is greater than a width of the initialization filter.

15. The non-transitory computer readable medium of claim 9, wherein a form of the update filter or of the initialization filter is expressible as a two-dimensional Gaussian function.

16. The non-transitory computer readable medium of claim 9, wherein evaluating the similarity of the updated halftone to the continuous-tone image comprises calculating a term that includes an inner product of the updated error image with a convolution of the initial error image with a function that represents a difference between the initialization filter and the update filter.

17. A data processing system comprising:
a processing unit in communication with a non-transitory computer usable medium, wherein the computer usable medium contains a set of instructions for generating a clustered halftone representation of a continuous-tone image for printing, wherein the processing unit is designed to carry out the set of instructions to:
apply a search technique wherein evaluation of a similarity between an initial halftone and the continuous-tone image includes application of an initialization filter to an initial error image that represents a difference between the initial halftone and the continuous-tone image, and wherein evaluation of a similarity between each updated halftone, formed by modifying a previously-evaluated halftone, and the continuous-tone image includes application of an update filter that is different from the initialization filter to an updated error image that represents a difference between the updated halftone and the continuous-tone image.

18. The system of claim 17, wherein the processing unit is designed to carry out instructions to modify the previously-evaluated halftone by changing a value of at least a pixel of the previously-evaluated halftone, and wherein the processing unit is designed to carry out instructions to:
replace the previously-evaluated halftone with the updated halftone if the evaluation of the updated halftone indicates that the updated halftone is more similar to the continuous-tone image than the previously-evaluated halftone; and
generate a final halftone by iteratively repeating the process of forming the updated halftone, evaluating the similarity of the updated halftone to the continuous-tone image, and replacing the previously-evaluated halftone with the updated halftone in accordance with the evaluation, until a predetermined criterion is satisfied.

19. The system of claim 18, wherein the processing unit is designed to carry out instructions to calculate a term that includes an inner product of the updated error image with a convolution of the initial error image with a function that represents a difference between the initialization filter and the update filter.

20. The system of claim 18, wherein the processing unit is designed to carry out instructions to generate a clustered-halftoning screen for a gray level by applying the search technique to a continuous-tone image that includes a uniform region of pixels with the gray level, and wherein changing the value is constrained by a stacking constraint with respect to a previously generated clustered-halftoning screen that was generated for a different gray level.

21. The system of claim 17, wherein a width of the update filter is greater than a width of the initialization filter.

\* \* \* \* \*

UNITED STATES PATENT AND TRADEMARK OFFICE
CERTIFICATE OF CORRECTION

PATENT NO. : 8,576,448 B2  
APPLICATION NO. : 13/006234  
DATED : November 5, 2013  
INVENTOR(S) : Omri Shacham et al.

Page 1 of 1

It is certified that error appears in the above-identified patent and that said Letters Patent is hereby corrected as shown below:

On the Title page, in Item (73), Assignee, in column 1, line 1, delete "Developmet" and insert -- Development --, therefor.

In the Claims

In column 12, line 7, in Claim 18, delete "continuous -tone" and insert -- continuous-tone --, therefor.

Signed and Sealed this  
Twenty-fifth Day of February, 2014

Michelle K. Lee  
*Deputy Director of the United States Patent and Trademark Office*